Figure 2:
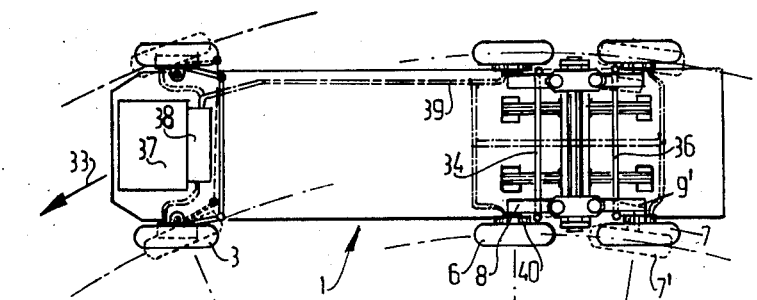

United States Patent [19]

Oosterling et al.

[11] 4,034,997

[45] July 12, 1977

[54] WHEEL AND AXLE ARRANGEMENT FOR AGRICULTURAL VEHICLE

[75] Inventors: Pieter Adriaan Oosterling; Hendricus Cornelis Van Staveren, both of Nieuw-Vennep, Netherlands

[73] Assignee: Multinorm B.V., Nieuw-Vennep, Netherlands

[21] Appl. No.: 614,420

[22] Filed: Sept. 18, 1975

[30] Foreign Application Priority Data

Oct. 25, 1974 Netherlands ............. 7414017

[51] Int. Cl.$^2$ ............... B60B 35/00; B62D 61/10
[52] U.S. Cl. .................... 280/81 A; 280/677; 180/66 R; 280/445
[58] Field of Search ........... 280/81 R, 81 A, 80 R, 280/104.5 R, 86, 104.5 A, 104.5 B, 448, 445, 443, 677

[56] References Cited

U.S. PATENT DOCUMENTS

| 2,072,787 | 3/1937 | Anderson | 280/81 A |
|---|---|---|---|
| 2,083,166 | 6/1937 | Jonkhoff | 280/81 A |
| 2,710,198 | 6/1955 | Hall | 280/104.5 R X |
| 2,847,228 | 8/1958 | Hall | 280/81 A |
| 2,848,245 | 8/1958 | Georgi | 280/81 A |
| 2,851,231 | 9/1958 | Westcott | 280/104.5 X |
| 2,985,251 | 5/1961 | Tellier | 280/81 R X |
| 3,042,421 | 7/1962 | Buske et al. | 280/81 A |
| 3,184,250 | 5/1965 | Bobrowski | 280/104.5 X |
| 3,254,901 | 6/1966 | Fisher et al. | 280/104.5 R X |

FOREIGN PATENT DOCUMENTS 1,580,044  7/1970  Germany ................. 280/81 A

*Primary Examiner* — Joseph F. Peters, Jr.
*Attorney, Agent, or Firm* — Snyder, Brown & Ramik

[57] ABSTRACT

In a vehicle comprising on each side one substantially horizontal jointed cross-shaft axle, a cradle frame pivotally journalled on said cross-shaft axle and consisting of one central section and two arms and two wheels supporting the cross-shaft axle and journalled each on one arm of the cradle frame, the wheels skid in bends. Consequently, the tyres are subject to heavy wear. When the vehicle is being used for agriculture, the structure of the soil is deteriorated by the skidding movement of the wheels. In order to prevent the skidding movement of the wheels, the arms are connected with the central section of the cradle frame so as to be pivotable about an upright axis.

9 Claims, 5 Drawing Figures

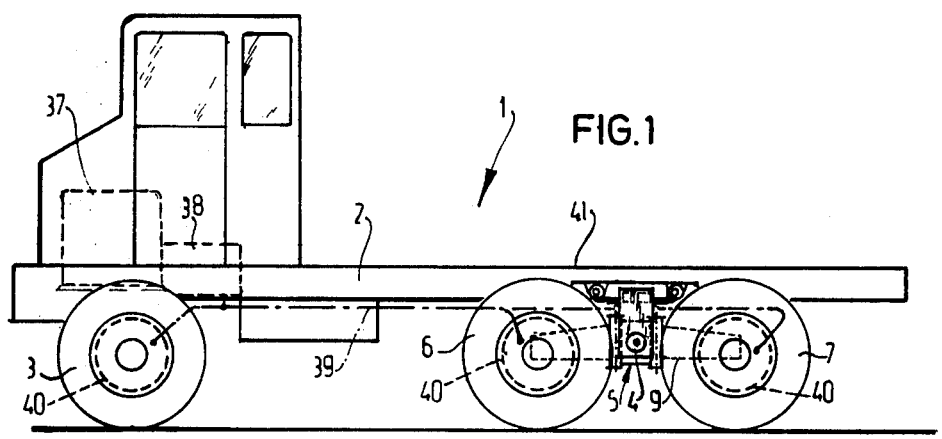
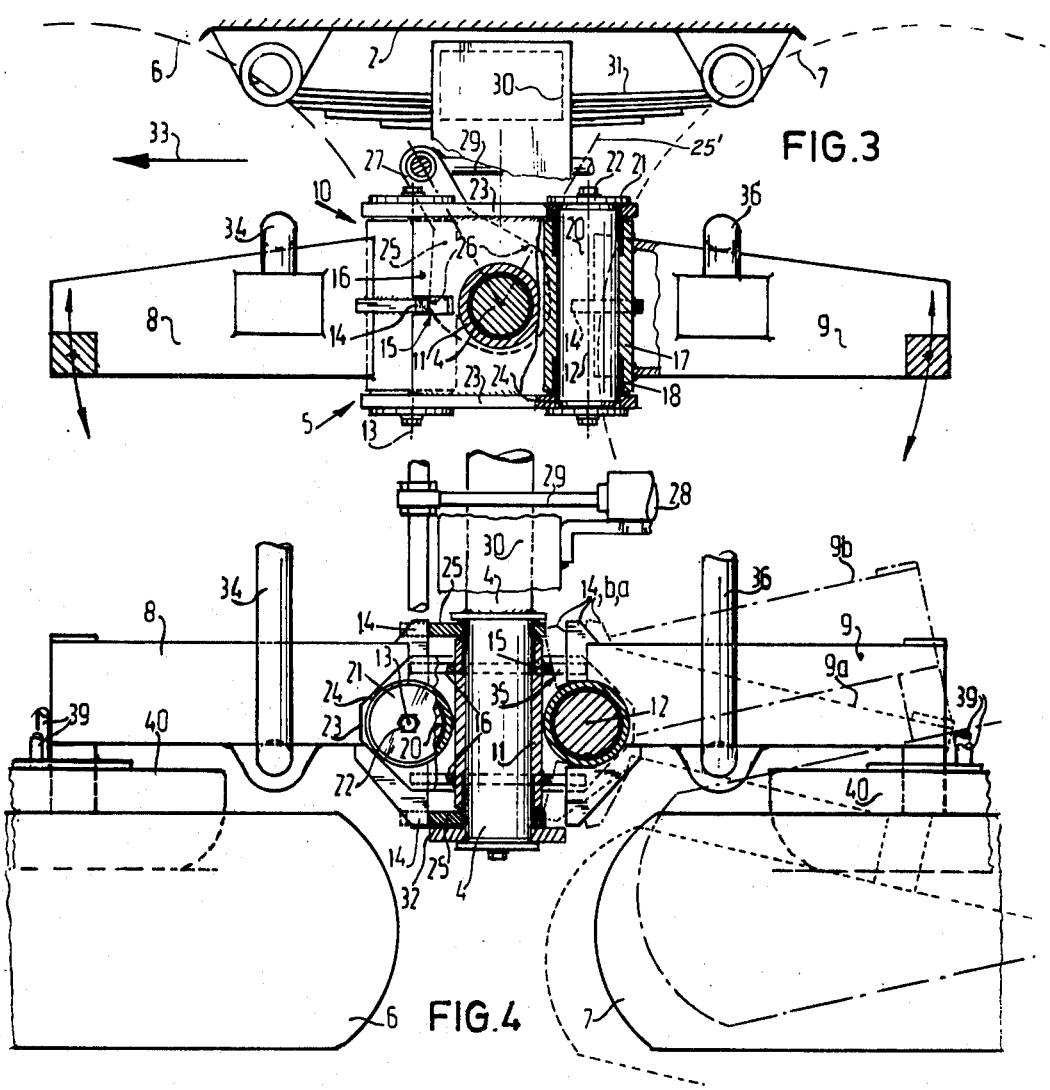

U.S. Patent  July 12, 1977  Sheet 2 of 2  4,034,997

WHEEL AND AXLE ARRANGEMENT FOR AGRICULTURAL VEHICLE

The invention relates to a vehicle comprising on each side at least one substantially horizontal jointed cross-shaft axle, a cradle frame pivotally journalled on said cross-shaft axle and consisting of at least one central section and at least two arms, and at least two wheels supporting the cross-shaft axle and journalled each on an arm of the cradle frame.

Such a vehicle is known and may carry, for example, a loading trough or one or more agricultural implements. The tyres of said wheels are subject to heavy wear because they perform skidding movements in bends. Moreover, the structure of the soil is deteriorated by the skidding movement of the wheels.

The invention has for its object to prevent or at least to reduce the skidding movement of the wheels supporting a jointed cross-shaft axle.

For this purpose at least one of the two arms of the vehicle according to the invention is connected with the central section of the cradle frame so as to be pivotable about an upright axis.

The aforesaid and further features of the invention will be explained in the following description with reference to the drawing.

Figure 6:
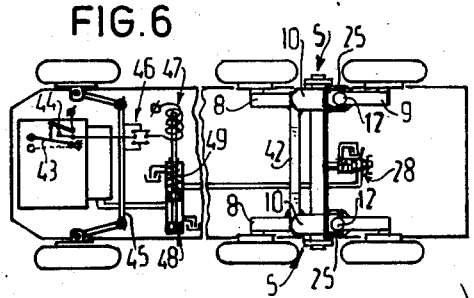
Figure 5:
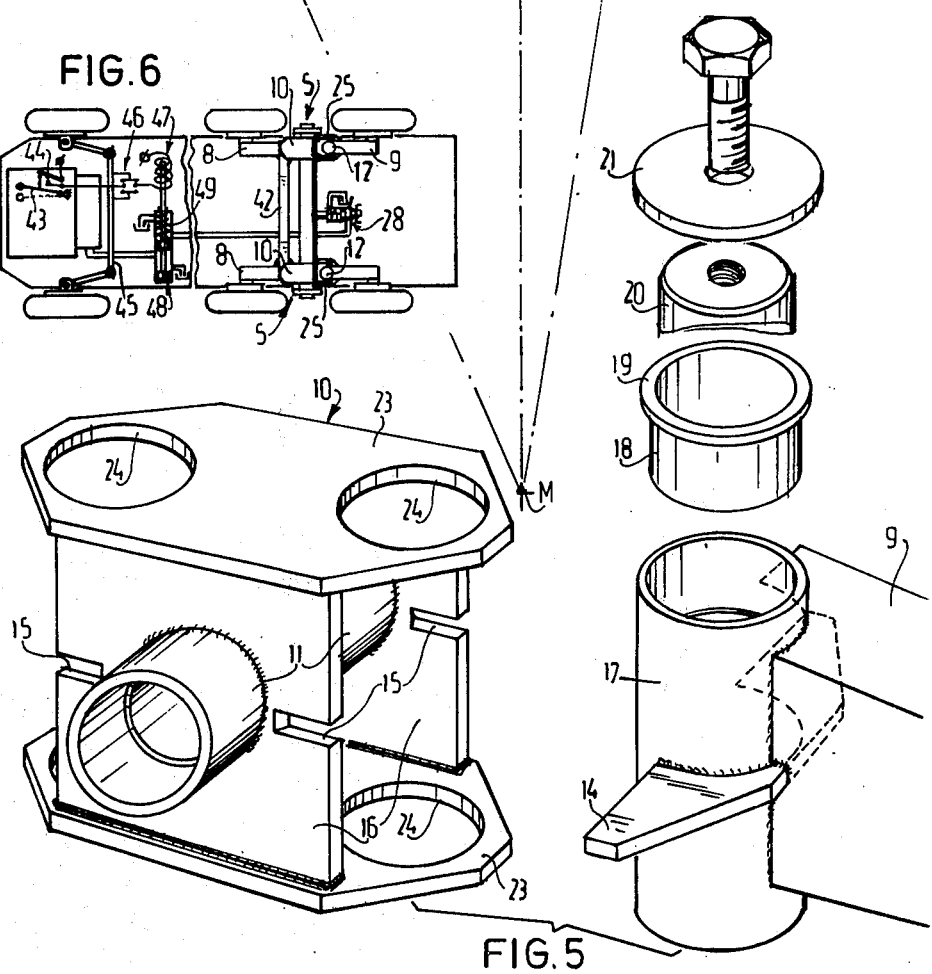

In the drawing:

FIGS. 1 and 2 are a side elevational view and a bottom view respectively of a vehicle in accordance with the invention, FIGS. 3, 4 and 5 show on an enlarged scale a side elevational view, a plan view and an exploded view respectively, partly broken away, of component parts in the proximity of a jointed cross-shaft axle and FIG. 6 is a schematic survey of a further vehicle in accordance with the invention.

The vehicle 1 comprises a chassis 2 having on each side a front wheel 3, a substantially horizontal jointed cross-shaft axle 4, a cradle frame 5 pivotally journalled on said cross-shaft axle 4 and two wheels 6 and 7 supporting the cross-shaft axle 4. The cradle frame 5 mainly consists of a central section 10, which is pivotally journalled on the cross-shaft axle 4 by means of a bearing bushing 11, of a rear arm 9 adapted to pivot about a vertical axis 12 and of a front arm 8 adapted to pivot about a vertical axis 13. The front wheel 6 and the rear wheel 7 are rotatably journalled on the front arm 8 and the rear arm 9 respectively. The front arm 8 and the rear arm 9 are each provided with two stop elements 14 located on each side of the vertical axis 13 and 12 respectively and formed by horizontal cams engaged in slots 15 of vertical plates 16 in the central section 10. Each arm 8 and 9 has a bearing bushing 17, which is pivotally journalled by means of synthetic resin sleeves 18 provided with a collar 19 on a vertical pin 20, which is secured by means of rings 21 and bolts 22 in bores 24 of horizontal plates 23 of the central section 10 (see FIGS. 3 and 5).

Locking means for blocking the pivotal movement of the arms 8 and 9 with respect to the central section 10 comprise on each side of the vehicle 1 two lock bolts 25 adapted to turn about the cross-shaft axle 4 and to co-operate each with a stop element 14 of the arms 8 and 9. Each lock bolt 25 has two locking faces 26 and an extension 27 coupled with the piston rod 29 of a hydraulic cylinder 28. The cylinder 28 is rigidly secured to a transverse beam 30, which supports the chassis 2 by means of leaf springs 31 and which bears by end plates 32 on the cross-shaft axle 4.

When the vehicle 1 is running in forward direction through a bend about a centre M in the direction of the arrow 33 in FIG. 2, the two front arms 8 have to be blocked in the central position, whereas the rear arms 9 occupy the position 9' indicated in FIG. 2 by broken lines so that the wheels 6 and 7' can describe a substantially circular path about the centre M. Therefore, during the forward travel the front arms 8 are constantly held in the blocked state, whereas the rear arms 9 are left free. To this end, power means such as the cylinder 28 as shown in FIG. 6 is energized in a manner such that the four lock bolts 25 of the vehicle 1 are all of them moved into the locked position shown in FIGS. 3 and 4, in which the two front arms 8 are blocked. The locking faces 26 of the lock bolts 25 then abut against the stop elements 14 of the front arms 8, whereas the rear arms 9 are capable of moving between the positions 9a and 9b indicated in FIG. 4 by broken lines and dot-and-dash lines respectively, because a free space is available between the faces 35 of the lock bolts 25 and the stop elements 14 of the rear arms 9.

It should be noted that the two front arms 8 are relatively coupled by means of a first tie bar 34. The two rear arms 9 are relatively coupled by means of a second tie bar 36 in order to ensure tracking of the wheels 6 or 7 in the non-blocked state. Before travelling in reverse sense the power means is energized in the opposite sense in order to drive the block bolts 25 into the other position indicated in FIG. 3 by the centre line 25', in which the rear arms 9 are blocked and the front arms 8 are released. If the rear arms 9 are not yet in the central position during the change-over of the lock bolts 25, they are urged by the lock bolts 25 into the central position during the initial reverse movement opposite the direction of the arrow 33. In order to prevent bending of the horizontal stop element 14, they are guided in the slots 15 of the central section 10.

The vehicle 1 shown in the drawing comprises an engine 37, which drives a hydraulic pump 38. The pump 38 communicates through hoses 39 with hydraulic motors 40 incorporated in the wheels 3, 6 and 7. The vehicle 1 may, however, also be a vehicle drawn, for example, by an agricultural tractor.

As shown in FIG. 1, the vehicle 1 may carry a loading platform 41, but it may also form the riding frame of, for example, a fertilizer distributor, a beet harvester or one or more other agricultural implements.

FIG. 6 shows a vehicle 1 in which the two cradle frames 5 on the left-hand and right-hand sides of the vehicle 1 are substantially rigidly coupled with one another by means of a bar 42. The front arms 8 of the cradle frame 5 are rigidly secured to the central sections 10. Only the rear arms 9 are adapted to pivot about a vertical axis 12 with respect to the central sections 10. The lock bolts 25 are moved by a hydraulic cylinder 28 into the unlocking position only during forward travel through a bend so that the rear arms 9 are freely pivotable. When travelling straight forward along a slope the vehicle 1 remains in the straight track. For this purpose the gear handle 43 of the vehicle 1 is provided with a switch 44, which closes during forward travel, whilst the tie bar 45 of the front wheels 3 is coupled with a switch 46, which closes at a deflection of the front wheels 3. The switches 46 and 44 are connected in series in an electric circuit of a control-member 47, which actuates a hydraulic regulator 48 of the cylinders 28 only when the two switches 46 and 44 are closed in order to unlock the rear arms 9. When one of the switches 46 or 44 is opened, a spring 49 urges the control-member 47 in the opposite direction in order to lock the rear arms 9.

What we claim is:

1. A vehicle comprising a frame, at least one substantially horizontal cross-shaft axle on each side of said frame, a cradle frame pivotally journalled on each said cross-shaft axle and consisting of at least one central section and two arms extending in opposite directions from said central section, a wheel journalled on each arm of the cradle frame, means pivotally connecting at least one of the two arms to the central section of the cradle frame so as to be pivotable about an upright axis whereby that wheel connected to said one arm is laterally swingable with such one arm to either side of a central position in which such wheel tracks a straight line, locking means for locking said one arm in said central position, and power means for actuating said locking means to urge said one arm to said central position, the locking means comprising at least one lock bolt adapted to turn about the cross-shaft axle.

2. A vehicle comprising a frame, at least one substantially horizontal cross-shaft axle on each side of said frame, a cradle frame pivotally journalled on each said cross-shaft axle and consisting of at least one central section and two arms extending in opposite directions from said central section, a wheel journalled on each arm of the cradle frame, means pivotally connecting at least one of the two arms to the central section of the cradle frame so as to be pivotable about an upright axis whereby that wheel connected to said one arm is laterally swingable with such one arm to either side of a central position in which such wheel tracks a straight line, locking means for locking said one arm in said central position, and power means for actuating said locking means to urge said one arm to said central position, each of the two arms being connected with the central section of the cradle frame so as to be pivotable about an upright axis, each pivotable arm being provided with a locking means and associated power means and wherein each locking means comprises at least two stop elements which limit pivotal movement of an arm.

3. A vehicle as claimed in claim 2 wherein the locking means comprise two lock bolts arranged on each side of the upright axis and adapted to move between two locking positions in which they block either the front arm or the rear arm of the cradle frame.

4. A vehicle as claimed in claim 2 wherein the two stop elements are formed by horizontal cams engaged in slots of the central section.

5. A vehicle comprising a frame, at least one substantially horizontal cross-shaft axle on each side of said frame, a cradle frame pivotally journalled on each said cross-shaft axle and consisting of at least one central section and two arms extending in opposite directions from said central section, a wheel journalled on each arm of the cradle frame, means pivotally connecting at least one of the two arms to the central section of the cradle frame so as to be pivotable about an upright axis whereby that wheel connected to said one arm is laterally swingable with such one arm to either side of a central position in which such wheel tracks a straight line, locking means for locking said one arm is said central position, and power means for actuating said locking means to urge said one arm to said central position, each of the two arms being connected with the central section of the cradle frame so as to be pivotable about an upright axis, including means for automatically actuating said power means to move said locking means into a position in which the rear arms are unlocked during forward travel of the vehicle.

6. A vehicle comprising a frame, at least one substantially horizontal cross-shaft axle on each side of said frame, a cradle frame pivotally journalled on each said cross-shaft axle and consisting of at least one central section and two arms extending in opposite directions from said central section, a wheel journalled on each arm of the cradle frame, means pivotally connecting at least one of the two arms to the central section of the cradle frame so as to be pivotable about an upright axis whereby that wheel connected to said one arm is laterally swingable with such one arm to either side of a central position in which such wheel tracks a straight line, locking means for locking said one arm in said central position, and power means for actuating said locking means to urge said one arm to said central position, each of the two arms being connected with the central section of the cradle frame so as to be pivotable about an upright axis, including means for automatically actating said power means to move said locking means into a position in which the front arms are unlocked during reverse travel of the vehicle.

7. A vehicle comprising a frame, at least one substantially horizontal cross-shaft axle on each side of said frame, a cradle frame pivotally journalled on each said cross-shaft axle and consisting of at least one central section and two arms extending in opposite directions from said central section, a wheel journalled on each arm of the cradle frame, means pivotally connected at least one of the two arms to the central section of the cradle frame so as to be pivotable about an upright axis whereby that wheel connected to said one arm is laterally swingable with such one arm to either side of a central position in which such wheel tracks a straight line, locking means for locking said one arm in said central position, and power means for actuating said locking means to urge said one arm to said central position, said vehicle including dirigible wheels, and means for actuating said power means to unlock said arms when said dirigible wheels are turned during forward movement of the vehicle.

8. In a vehicle having a frame and a horizontal axle, a member pivotally supported on said axle, and a pair of wheels connected to said member and each adapted to track along a line parallel to the longitudinal axis of the frame when the vehicle is travelling a straight line, the improvement which comprises:

a first arm pivotally connected at one end to said member and extending forwardly therefrom and a second arm pivotally connected at one end to said member and extending rearwardly therefrom, one of said wheels being mounted at the free end of said first arm and the other of said wheels being mounted at the free end of said second arm, and the pivotal connections of said arms permitting them to swing laterally to either side of a central position in which said wheels are tracking a straight line; and means for selectively camming said first arm to said central position while freeing said second arm to swing laterally, and vice versa, so that in either direction of movement of said frame, that arm which is in leading relation is locked in its central position while the other arm is trailing and is free to swing laterally so that the wheel attached to such trailing arm is free to track a curvilinear path in cooperation with the other wheel.

9. In a vehicle having a frame and a horizontal axle, a member pivotally supported on said axle, and a pair of wheels connected to said member and each adapted to track along a line parallel to the longitudinal axis of the frame when the vehicle is travelling a straight line, the improvement which comprises:

a first arm rigidly connected to said member and projecting forwardly therefrom, one of said wheels being mounted on said first arm;

a second arm extending rearwardly from said member and means pivotally mounting said second arm on said member for lateral swinging with respect thereto, the other wheel being mounted on said second arm;

means camming said second arm to a central position in which said other wheel tracks a straight line for locking said second arm in said central position when said vehicle is operated in reverse direction; and means actuating the means first mentioned when said vehicle is operated in forward direction for releasing said second arm to swing freely in response to turning motion imparted to said frame.

* * * * *